(12) United States Patent
Braley et al.

(10) Patent No.: US 12,321,585 B2
(45) Date of Patent: Jun. 3, 2025

(54) METHODS AND DEVICES FOR INTERACTIONS USING COMBINATION GAZE AND TOUCH INPUTS

(71) Applicants: Sean Brian Braley, Orillia (CA); Roeland Petrus Hubertus Vertegaal, Perth Road Village (CA); Calvin John Rubens, Ottawa (CA)

(72) Inventors: Sean Brian Braley, Orillia (CA); Roeland Petrus Hubertus Vertegaal, Perth Road Village (CA); Calvin John Rubens, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/502,745

(22) Filed: Nov. 6, 2023

(65) Prior Publication Data

US 2025/0147652 A1    May 8, 2025

(51) Int. Cl.
*G06F 3/0481* (2022.01)
*G06F 3/01* (2006.01)
*G06F 3/0485* (2022.01)
*G06F 3/0488* (2022.01)
*G06F 21/32* (2013.01)

(52) U.S. Cl.
CPC ............ *G06F 3/0485* (2013.01); *G06F 3/013* (2013.01); *G06F 3/0488* (2013.01); *G06F 21/32* (2013.01)

(58) Field of Classification Search
CPC .................................................. G06F 3/04883
See application file for complete search history.

(56) References Cited

U.S. PATENT DOCUMENTS

| 5,850,211 | A | 12/1998 | Tognazzini | |
|---|---|---|---|---|
| 7,762,665 | B2 | 7/2010 | Vertegaal | |
| 8,292,433 | B2 | 10/2012 | Vertegaal | |
| 10,373,617 | B2 | 8/2019 | Piernot | |
| 2006/0265653 | A1* | 11/2006 | Paasonen | G06F 9/00 |
| | | | | 715/779 |
| 2013/0135196 | A1 | 5/2013 | Park | |
| 2022/0091722 | A1* | 3/2022 | Faulkner | G06T 19/003 |
| 2022/0250543 | A1* | 8/2022 | Szczerba | B60W 30/143 |
| 2023/0094522 | A1* | 3/2023 | Stauber | G06F 3/04845 |
| | | | | 715/719 |

OTHER PUBLICATIONS

Vertegaal, R. (2003). Attentive user inter-faces: Introduction. Communications of the ACM, 46, 30-33. 2003.

(Continued)

*Primary Examiner* — Nan-Ying Yang

(57) ABSTRACT

Methods and devices are described that enable user interactions using a combination of gaze input and touch input. During display of interactive elements on a display of an electronic device, an estimated gaze location of a gaze input is determined. A target interactive element is identified based on the estimated gaze location. Touch input is detected that traverses a first distance in a first direction. A preview of information related to the target interactive element is displayed, where an amount of the information displayed in the preview is based on the first distance traversed by the touch input.

21 Claims, 9 Drawing Sheets

(56) References Cited

OTHER PUBLICATIONS

A. M. Penkar, C. Lutteroth, and G. Weber. (2012). Designing for the eye: design parameters for dwell in gaze interaction. In Proceedings of the 24th Australian Computer-Human Interaction Conference (OzCHI '12). Association for Computing Machinery, New York, NY, USA, 479-488. 2012.

R. J. K. Jacob. (1991). The Use of Eye Movements in Human-Computer Interaction Techniques: What You Look At is What You Get. In ACM Trans. Inf. Syst. 9, 2, 152-169. 1991.

K. Pfeffer, H. Gellersen. (2016). Gaze and Touch Interaction on Tablets. In Proceedings of the 29th Annual Symposium on User Interface Software and Technology (UIST '16). Association for Computing Machinery, New York, NY, USA, 301-311. 2016.

S. Zhai, C. Morimoto, and S. Ihde. (1999). Manual and gaze input cascaded (MAGIC) pointing. In Proceedings of the SIGCHI conference on Human Factors in Computing Systems (CHI '99). Association for Computing Machinery, New York, NY, USA, 246-253. 1999.

\* cited by examiner

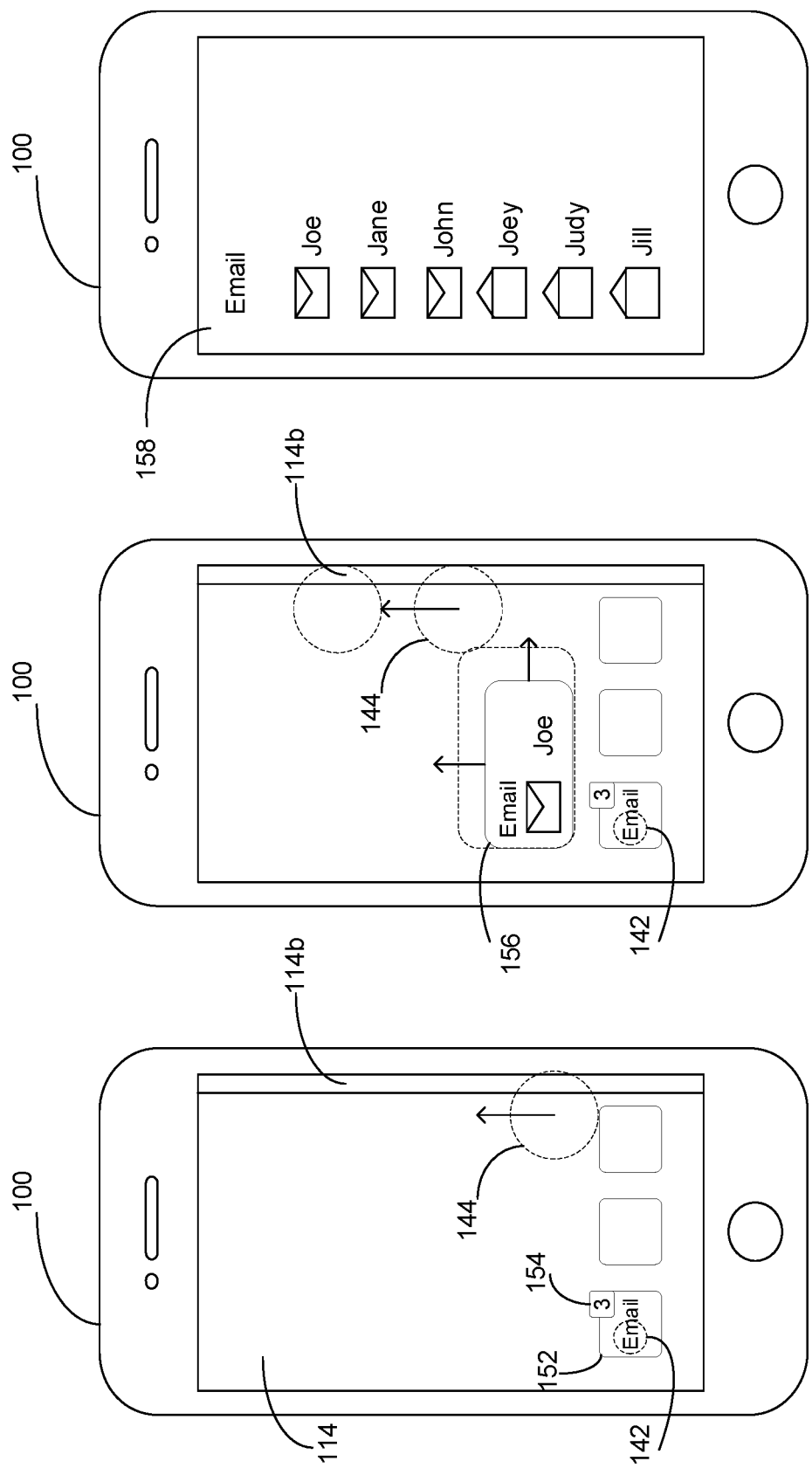

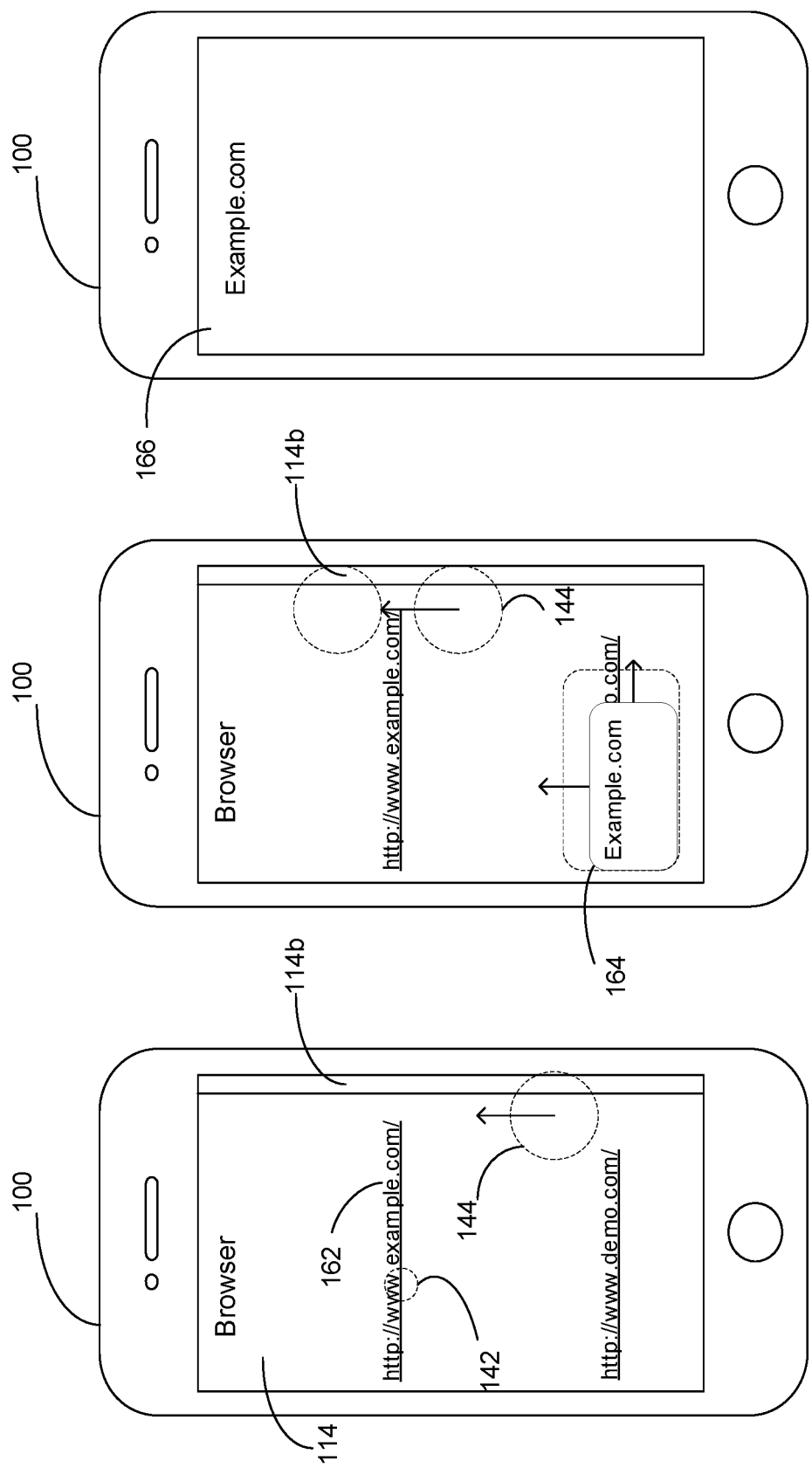

METHODS AND DEVICES FOR INTERACTIONS USING COMBINATION GAZE AND TOUCH INPUTS

CROSS-REFERENCE TO RELATED APPLICATIONS

This is the first application for this disclosure.

TECHNICAL FIELD

The present disclosure relates to methods and devices enabling interactions using a combination of gaze and touch inputs, in particular methods and devices enabling interactions with a displayed user interface on a touch-sensitive device using a combination of gaze and touch inputs.

BACKGROUND

Eye gaze estimation (also referred to as eye tracking) is a computer vision (CV) task that has received significant interest in recent years. Gaze estimation has been studied for improving human-computer interactions. Example applications of gaze estimation include gaze-based control for hands-free interaction, gaze-based control for augmenting manual interactions, user attention analysis, understanding human behavior, and augmented/virtual reality (AR/VR) rendering, among others. However, many existing gaze-based interactions are overly-sensitive and/or inefficient. Additionally, many existing user interactions are based on touch inputs rather than gaze inputs.

It would be useful to enable improved interactions using a combination of gaze and touch inputs.

SUMMARY

In various examples, the present disclosure describes methods and devices that enable user interactions using gaze input in combination with another input modality, such as touch input. Examples of the present disclosure provide a technical advantage in that false positives may be reduced and/or efficiency of interactions may be increased compared to conventional gaze-based interactions.

Examples of the present disclosure may also use a combination of gaze input and touch input to provide a form of progressive preview (or progressive disclosure) that may progressively increase the amount of information displayed. This may provide a more intuitive user interface, and may enable a user to control the privacy or security of the displayed information.

Examples of the present disclosure may also provide techniques for using gaze input in combination with touch input to help with disambiguation of touch input and/or to help prevent unintentional touches from being detected as valid touch inputs. Such examples may provide a technical advantage in that the accuracy and/or precision of touch inputs may be improved.

In an example aspect, the present disclosure describes a method at an electronic device. The method includes: during display of one or more interactive elements on a display of the electronic device, determining an estimated gaze location of a gaze input on the display; identifying a target interactive element of the one or more interactive elements, based on the estimated gaze location; detecting touch input that traverses a first distance in a first direction; and displaying a preview of information related to the target interactive element, an amount of the information displayed in the preview being based on the first distance traversed by the touch input.

In an example of the preceding example method, the method may include: detecting that the touch input continues to traverse a farther distance, greater than the first distance, in the first direction; and increasing the amount of information displayed in the preview based on the farther distance.

In an example of any of the preceding example methods, a first amount of information may be displayed in the preview based on the first distance exceeding a first distance threshold.

In an example of any of the preceding example methods, the method may include: detecting that the touch input continues to traverse a second distance, which exceeds a second distance threshold, in the first direction; and causing an application or page related to the target interactive element to be opened.

In an example of any of the preceding example methods, the method may include: detecting that the touch input continues in a second direction opposite to the first direction; and decreasing the amount of information displayed in the preview.

In an example of any of the preceding example methods, a notification indicator of the target interactive element may be identified based on the estimated gaze location, and the information displayed in the preview may be further related to the notification indicator.

In an example of any of the preceding example methods, the target interactive element may be a selectable icon related to an application, and the information displayed in the preview may be a preview of information from the application.

In an example of any of the preceding example methods, the target interactive element may be a selectable link related to a page, and the information displayed in the preview may be a preview of information from the page.

In an example of any of the preceding example methods, the method may include: prior to detecting the touch input, enabling the target interactive element based on the estimated gaze location; where enabling the target interactive element may enable the preview to be displayed based on the touch input.

In another example aspect, the present disclosure describes an electronic device including a processing unit configured to execute instructions to cause the electronic device to: during display of one or more interactive elements on a display of the electronic device, determine an estimated gaze location of a gaze input on the display; identify a target interactive element of the one or more interactive elements, based on the estimated gaze location; detect touch input that traverses a first distance in a first direction; and display a preview of information related to the target interactive element, an amount of the information displayed in the preview being based on the first distance traversed by the touch input.

In an example of the preceding example electronic device, the instructions may further cause the electronic device to: detect that the touch input continues to traverse a farther distance, greater than the first distance, in the first direction; and increase the amount of information displayed in the preview based on the farther distance.

In an example of any of the preceding example electronic devices, a first amount of information may be displayed in the preview based on the first distance exceeding a first distance threshold.

In an example of any of the preceding example electronic devices, the instructions may further cause the electronic device to: detect that the touch input continues to traverse a second distance, which exceeds a second distance threshold, in the first direction; and cause an application or page related to the target interactive element to be opened.

In an example of any of the preceding example electronic devices, the instructions may further cause the electronic device to: detect that the touch input continues in a second direction opposite to the first direction; and decrease the amount of information displayed in the preview.

In an example of any of the preceding example electronic devices, a notification indicator of the target interactive element may be identified based on the estimated gaze location, and the information displayed in the preview may be further related to the notification indicator.

In an example of any of the preceding example electronic devices, the instructions may further cause the electronic device to: prior to detecting the touch input, enable the target interactive element based on the estimated gaze location; where enabling the target interactive element may enable the preview to be displayed based on the touch input.

In another example aspect, the present disclosure describes a method at an electronic device. The method includes: during display of one or more interactive elements on a display of the electronic device, determining an estimated gaze location of a gaze input on the display; identifying a target interactive element of the one or more interactive elements, based on the estimated gaze location; detecting touch input at or near the target interactive element; and selecting the target interactive element based on the detected touch input.

In an example of the preceding example method, the method may include: prior to detecting the touch input, enabling the target interactive element based on the estimated gaze location; where enabling the target interactive element may enable selection of the target interactive element using the touch input.

In an example of the preceding example method, the target interactive element may be enabled based on biometric data derived from the gaze input.

In an example of any of the preceding example methods, the touch input may be also detected at or near another different interactive element, and the target interactive element may be selected based on the gaze input and touch input.

In another example aspect, the present disclosure describes an apparatus including: a processing unit; and a memory including instructions that, when executed by the processing unit, cause the apparatus to perform any preceding examples of the preceding example aspects of the methods.

In another example aspect, the present disclosure describes a non-transitory computer readable medium having machine-executable instructions stored thereon, wherein the instructions, when executed by an apparatus, cause the apparatus to perform any preceding examples of the preceding example aspects of the methods In another example aspect, the present disclosure describes a processing module configured to control an apparatus to cause the apparatus to carry out any preceding examples of the preceding example aspects of the methods.

In another example aspect, the present disclosure describes a system chip including a processing unit configured to execute instructions to cause an apparatus to carry out any preceding examples of the preceding example aspects of the methods.

In another example aspect, the present disclosure describes a computer program characterized in that, when the computer program is run on a computer, the computer is caused to execute any preceding examples of the preceding example aspects of the methods.

BRIEF DESCRIPTION OF THE DRAWINGS

Reference will now be made, by way of example, to the accompanying drawings which show example embodiments of the present application, and in which:

FIGS. 2A-2C illustrate an example in which gaze input in combination with touch input is used to provide progressive preview of information from an application, in accordance with examples of the present disclosure;

FIGS. 3A-3C illustrate an example in which gaze input in combination with touch input is used to provide progressive preview of information from a page, in accordance with examples of the present disclosure;

Similar reference numerals may have been used in different figures to denote similar components.

DETAILED DESCRIPTION

In various examples, the present disclosure describes methods and devices that enable a combination of gaze and touch inputs to be used for interacting with an electronic device. In the present disclosure, the term "touch input" is intended to encompass various types of input that may be detected by an electronic device as a result of an object (e.g., a user's finger or a stylus) being in contact with or nearly in contact with the electronic device. A touch input may, for example, be an input detected by a capacitive sensor, a force sensor or a pressure sensor, among others, as well as a combination of such sensors. Thus, the term "touch input" may encompass force input and pressure input.

In the present disclosure, an electronic device may be any device that has a display, including a mobile communication device (e.g., smartphone), a tablet device, a laptop device, a desktop device, a vehicle-based device (e.g., an infotainment system or an interactive dashboard device), a wearable device (e.g., smartglasses, smartwatch or head mounted display (HMD)), an interactive kiosk device, or an Internet of Things (IoT) device, among other possibilities.

Figure 1A:
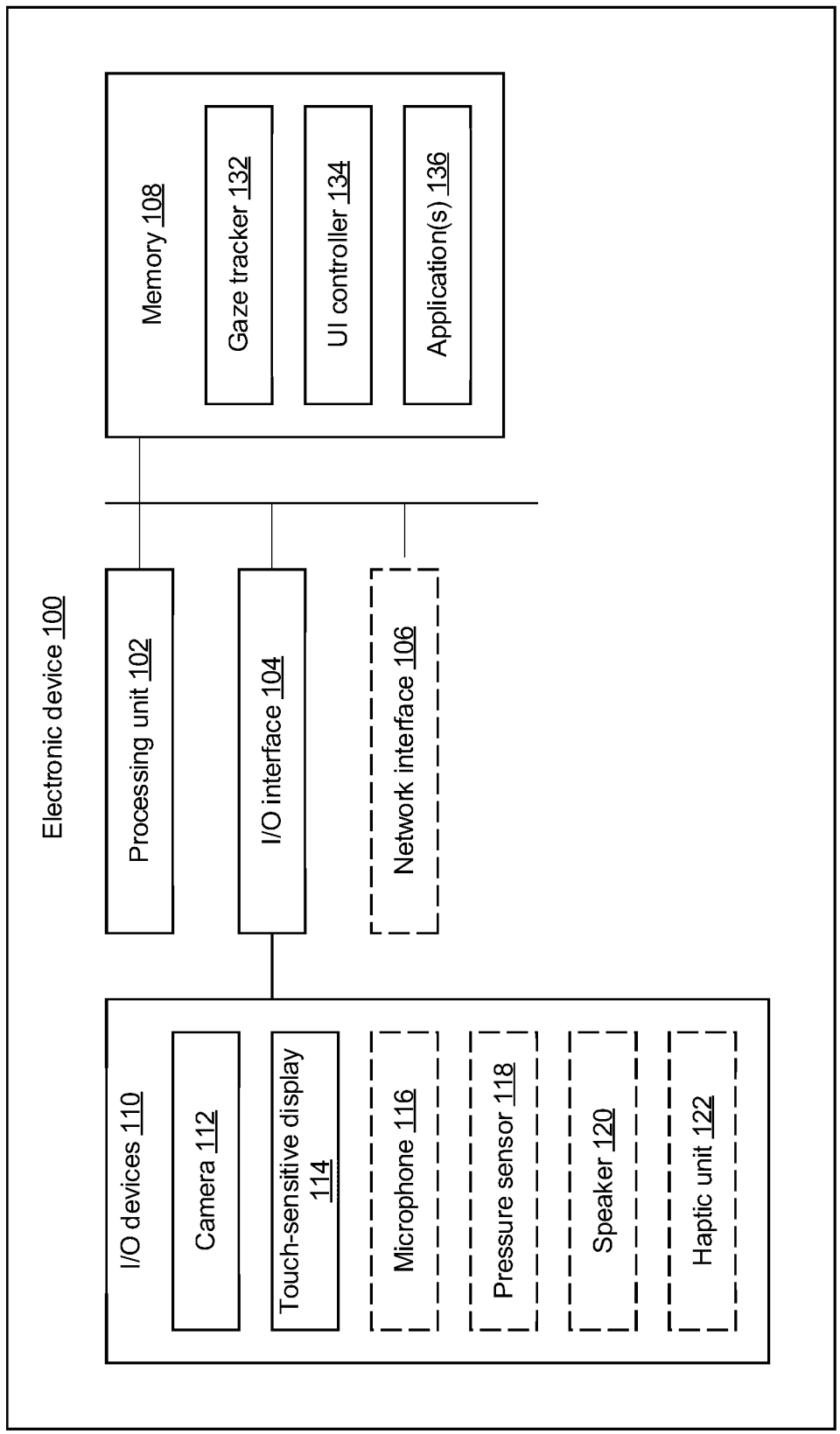
FIG. 1A is a block diagram illustrating an example of an electronic device which may be used to implement examples of the present disclosure.

FIG. 1A is a block diagram showing some components of an example electronic device 100 (which may also be referred to generally as an apparatus), which may be used to implement embodiments of the present disclosure. Although an example embodiment of the electronic device 100 is shown and discussed below, other embodiments may be used to implement examples disclosed herein, which may include components different from those shown. Although FIG. 1A shows a single instance of each component, there may be multiple instances of each component shown.

The electronic device 100 includes one or more processing units 102, such as a processor, a microprocessor, an application-specific integrated circuit (ASIC), a field-programmable gate array (FPGA), a dedicated logic circuitry, a dedicated artificial intelligence processor unit, or combinations thereof. The electronic device 100 also includes one or more input/output (I/O) interfaces 104, which interfaces with one or more I/O devices 110 such as a camera 102, a touch-sensitive display 114 (also referred to as a touchscreen or simply a display), optional microphone 116, optional pressure sensor 118 (also referred to as a force sensor), optional speaker and/or optional haptic unit 122 (also referred to as a vibration unit). The electronic device 100 may include other input devices (e.g., physical buttons, keyboard, etc.) and/or other output devices (e.g., lights, etc.).

The electronic device 100 may include one or more optional network interfaces 106 for wired or wireless communication with a network (e.g., an intranet, the Internet, a P2P network, a WAN and/or a LAN) or other node. The network interface 106 may include wired links (e.g., Ethernet cable) and/or wireless links (e.g., one or more antennas) for intra-network and/or inter-network communications. In some examples, the network interface 106 may enable the electronic device 100 to communicate with a network to access cloud-based services.

The electronic device 100 includes one or more memories 108, which may include a volatile or non-volatile memory (e.g., a flash memory, a random access memory (RAM), and/or a read-only memory (ROM)). The non-transitory memory 108 may store instructions for execution by the processing unit 102, such as to carry out examples described in the present disclosure. For example, the memory 108 may include instructions, executable by the processing unit 102, to implement a gaze tracker 132 that detects and tracks a user's gaze (e.g., detects and tracks the location of the user's gaze on the display 114, using images of the user's eyes captured by the camera 112). The memory 108 may also include instructions to implement a user interface (UI) controller 134 that controls interactions with a UI based on a combination of gaze and touch inputs, as discussed further below. The memory 108 may also include instructions to implement one or more software applications 136 (e.g., email application, browser application, calendar application, etc.). The memory 108 may include other software instructions, such as for implementing an operating system and other functions of the electronic device 100.

In some examples, the electronic device 100 may also include one or more electronic storage units (not shown), such as a solid state drive, a hard disk drive, a magnetic disk drive and/or an optical disk drive. In some examples, one or more data sets and/or modules may be provided by an external memory (e.g., an external drive in wired or wireless communication with the electronic device 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The components of the electronic device 100 may communicate with each other via a bus, for example.

Examples of the present disclosure enable user interactions with the electronic device 100 using a combination of gaze input (e.g., detected by the gaze tracker 132) and touch input (e.g., detected by the touch-sensitive display 114). In some examples, touch input may be detected by a pressure sensor 118 instead of (or in addition to) a capacitive sensor of the touch-sensitive display 114. In some examples, the pressure sensor 118 may be integrated with the touch-sensitive display 114. In some examples, a pressure sensor 118 may be separate from the display 114 on the electronic device 100 (e.g., a touch-sensitive display 114 may be provided on the front of the electronic device 100 to detect touch input and a pressure sensor 118 may be provided on the back of the electronic device 100) to detect pressure input. Other variations may be encompassed by the present disclosure.

Figure 1B:
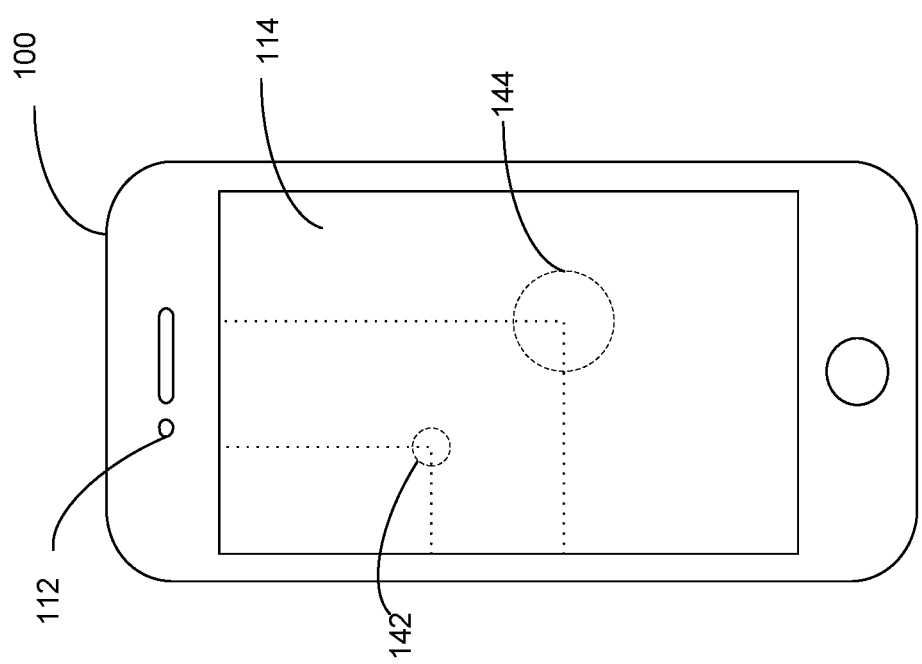
FIG. 1B illustrates a front view of an example electronic device which may be used to implement examples of the present disclosure.

FIG. 1B is a front view of an example embodiment of the electronic device 100, which is a smartphone in this example. It should be understood that the description of FIG. 1B may be adapted for other embodiments of the electronic device 100, such as a tablet, laptop, etc.

The camera 112 may capture images of the user's eyes while the user is looking at the display 114. The captured images may be used by the gaze tracker 132 to detect and track the gaze input 142. The estimated location of the gaze input 142 may be represented as an x-y coordinate in the frame of reference of the display 114 (e.g., x-y coordinate in terms of screen pixels). A touch input 144 may be detected by the display 114 (e.g., using capacitive sensors, resistive sensors, pressure sensors, etc.) and a location of the touch input 144 (also referred to as the touch location) may also be represented as an x-y coordinate in the frame of reference of the display 114 (e.g., x-y coordinate in terms of screen pixels). The touch input 144 may be detected over a region of the display 114 rather than at a point, in which case the touch location may be the centroid of the touch input 144. Both the gaze input 142 and the touch input 144 may be provided as sensed inputs (e.g., represented by their respective x-y coordinates) and used by the UI controller 134 to manage interactions with a UI displayed on the display 114.

To assist in understanding the present disclosure, some background about gaze-based interactions is provided.

Typically, gaze estimation may be performed with respect to a frame of reference, such as the x-y coordinates on a display. If gaze estimation is implemented by a head-mounted gaze tracker, the estimated location of a gaze may be represented as an x-y coordinate in the frame of reference of a world-facing camera view. Current state-of-the-art gaze estimation may be accurate to approximately 1°. Gaze estimation functions are increasingly common in consumer devices, such as smartphones, laptops and tablets. As such, there is interest in using gaze estimation to provide an improved user experience. For example, there is interest in using gaze estimation for more precise and/or accurate inputs, particularly for users with physical limitations. There is also interest in using gaze estimation to assist users in providing inputs where the input area (e.g., touch-sensitive display) is large, such that a user's finger may not be able to reach the desired location or where moving the finger to the desired location would slow down the user's interactions.

Some existing gaze-based interactions use dwell-time (i.e., the amount of time that the detected gaze is maintained within a specific region of interest) of the estimated gaze as a selection or confirmation input. This may help to reduce or avoid false positives (in which gaze input is incorrectly detected as a selection or confirmation input) but may be inefficient and slow down user interactions. Further, such an interface is not intuitive and may give the user an impression that the interface is unresponsive, which may result in the user trying other inputs. Other existing gaze-based interactions require a blinking of the eye to indicate a selection or confirmation input. However, because this action is typically an involuntary action, false positives may result.

Some UIs, referred to sometimes as attentive user interfaces (AUIs), use gaze estimation to estimate the user's attention on a task or device. However, these approaches typically estimate the user's general region of interest and are not useful for precision tasks (e.g., selection of icons). Yet other existing gaze-based interactions use gaze estimation to move the region of a user's interaction (e.g., move a mouse cursor to the estimated location of the user's gaze). However such approaches still provide a mainly cursor-based interaction and may fail to improve the precision of inputs.

In the present disclosure, examples are described that may provide improvements over some of the existing gaze-based interactions. Examples of the present disclosure may enable a user to interact with an electronic device using a combination of gaze and touch inputs.

In some examples, gaze input may be used to identify a target interactive element (e.g., a target icon or target link) and touch input (e.g., a swipe gesture or drag gesture) may be used to progressively disclose information related to the identified interactive element. For example, a preview of the application or webpage related to the target icon or target link may be displayed, where the amount of information shown in the preview progressively increases as the touch input traverses a greater distance. This may provide a convenient and intuitive way for a user to control the amount of information displayed.

In some examples, gaze input may be used to disambiguate a touch input to help improve the accuracy of using touch to select an interactive element on a display. For example, if the touch input covers two interactive elements (e.g., the touch input is detected as a touch region that overlaps with two interactive elements), the estimated location of a user's gaze on the display may be used to identify the intended interactive element.

In some examples, gaze input may be used to disambiguate between valid and invalid touch inputs (or between intended and unintended touch inputs). For example, an interactive element may be inactive (and thus unable to be selected by touch input) until the interactive element is the target of the user's gaze, at which time the interactive element may become active and able to be selected by touch input. This may help to prevent spurious inputs, such as a user unintentionally opening an application or unintentionally selecting a soft button when the user accidentally touches a touch-sensitive display. The requirement for gaze input in order to activate an interactive element may also help to ensure that the selection of the interactive element is from a valid user (e.g., a human user rather than a bot).

FIGS. 2A-2C illustrate an example embodiment in which gaze input in combination with touch input is used to provide progressive preview of information related to an interactive element, in this case progressive preview of information from an application related to the interactive element. Although FIGS. 2A-2C are illustrated in the context of a smartphone as the electronic device 100, this is not intended to be limiting.

In FIG. 2A, a plurality of interactive elements 152 (e.g., selectable icons) are shown on the touch-sensitive display 114, for example while a home screen or application selection page is displayed. Each of the interaction elements 152 may be related to a respective application of the electronic device 100, for example. In particular, one of the interactive elements 152 is related to an email application and includes a notification indicator 154 (in this case, indicating there are three unread emails). In this example, an edge portion 114*b* may be defined in the display 114. The edge portion 114*b* may be a logical definition and may not require any physical separation of the display 114; further, the edge portion 114*b* may not be visually distinguishable from the remainder of the display 114. The location of the edge portion 114*b* may be on the left side and/or right side of the display 114, and may be selectable to suit the handedness of the user.

In FIG. 2A, gaze input 142 is detected at an estimated location that overlaps with the interaction element 152 related to the email application. This particular interaction element 152 may be identified as being the target interaction element 152. While the gaze input 142 remains on the target interaction element 152, touch input 144 is detected at or near the edge portion 114*b*. The touch input 144 is a moving (or dynamic) input, in this example moving up along the edge portion 114*b*, as indicated by the arrow in FIG. 2A. It should be understood that the touch input 144 may be a swipe or drag gesture that moves in other directions, such as a diagonal gesture, horizontal gesture, curved gesture, etc., and need not be at or near the edge portion 114*b*.

In FIG. 2B, in response to detecting the moving touch input 144 while the gaze input 142 is detected on the target interaction element 152, a preview 156 related to the interaction element 152 is generated and displayed on the display 114. The preview 156 may be show at any suitable location on the display 114, for example close to the location of the target interaction element 152. In this example, because the interaction element 152 is related to the email application, the preview 156 provides information related to the email application, such as a preview of an unread email. As the touch input 144 moves further (indicated by the arrow in FIG. 2B), the preview 156 may correspondingly increase in size and/or amount of information shown. For example, the size of and/or amount of information in the preview 156 may linearly increase with the distance traversed by the touch input 144. In other examples, the size of and/or amount of information in the preview 156 may increase non-linearly with the distance traversed by the touch input 144. In yet other examples, the size of and/or amount of information in the preview 156 may increase in a stepwise manner (e.g., may increase a fixed amount when the touch input 144 has traversed a certain distance). In some examples, after the preview 156 has been initiated, only the touch input 144 may be required to continue increasing the preview 156; the gaze input 142 may not need to remain on the target interaction element 152.

The amount of information shown in the preview 156 may progressively increase in a gradual manner (e.g., as the size of the preview 156 gradually increases, the amount of information shown in the preview 156 may increase correspondingly) or in a stepwise manner. For example, when the touch input 144 has traversed a short distance (e.g., less than a quarter of the length of the display 114) the preview 156 for the email application may initially show a first amount of information, such as only the name of the sender of a most recent unread message (e.g., as shown in FIG. 2B). When the touch input 144 has traversed a medium distance (e.g., about half the length of the display 114) the preview 156 may show a second amount of information (which may be different from or larger than the first amount of information), such as showing the name of the sender as well as a subject line of the most recent unread message. The amount and/or type of information provided in the preview 156 may depend on the related application.

After the touch input 144 has traversed a predetermined threshold distance (e.g., more than two-thirds the length of the display 114), the related application may be fully opened. The touch input 144 may then be released and the application may remain open. For example, as shown in FIG. 2C, the email application 158 is opened on the electronic device 100. If the touch input 144 is released before the threshold distance has been reached but has traversed at least a minimum distance has (e.g., minimum of one quarter the length of the display 114), the preview 156 may remain at the size and amount of shown information that was reached before the touch input 144 was released. If the touch input 144 is released before the minimum distance has been reached, the preview 156 may be closed. Alternatively, releasing the touch input 144 any time before the application is fully opened may result in the preview 156 being closed. If, while the preview 156 is shown and before the touch input 144 has traversed the threshold distance, the touch input 144 is moved in the opposite direction (e.g., back down along the edge portion 114b), the preview 156 may corresponding decrease in size and/or amount of information shown.

In some examples, if the touch input 144 is released and the preview 156 remains opened, a combination of gaze and touch input may against be used to open a further preview of an item within the preview 156. For example, while the preview 156 remains opened, another gaze input may be detected at an icon for an unread email. Then performing another moving touch input (e.g., another swipe gesture along the edge portion 114b) may cause a further preview to be generated to preview the contents of the unread email. Thus, previews may be generated in a hierarchical manner, in which a further preview may be generated to show information related to an item displayed by a higher-level preview.

In some examples, if there is a notification indicator 154 associated with the interactive element 152, the gaze input 142 may be detected to fall on the notification indicator 154 specifically. In such cases, the preview 156 may provide information specific to the notification indicator 154.

FIGS. 3A-3C illustrate an example embodiment in which gaze input in combination with touch input is used to provide progressive preview of information related to an interactive element, in this case progressive preview of information from a page related to the interactive element. Although FIGS. 3A-3C are illustrated in the context of a smartphone as the electronic device 100, this is not intended to be limiting.

In FIG. 3A, the interactive element 162 is a link, for example for navigating to a webpage in a browser application. The gaze input 142 is detected at an estimated location at or near a particular interactive element 162 (e.g., a link to www.example.com), which may be identified as the target interactive element 162. While the gaze input 142 is on the target interactive element 162, a touch input 144 is detected (e.g., along the edge portion 114b or elsewhere on the display 114). The touch input 144 is a moving (or dynamic) input, such as a swipe gesture or drag gesture.

As shown in FIG. 3B, in response to the moving touch input 144, a preview 164 is generated. The preview 164 may be used to display information from the page related to the target interactive element 162 (e.g., a heading of the webpage). The preview 164 may increase in size and/or amount of information shown, corresponding to increasing distance traversed by the touch input 144, in a manner similar to that described previously with respect to FIGS. 2A-2C.

When the touch input 144 has traversed a threshold distance, the page 166 related to the target interactive element 162 may be fully opened in the browser, as shown in FIG. 3C.

Figure 4C:
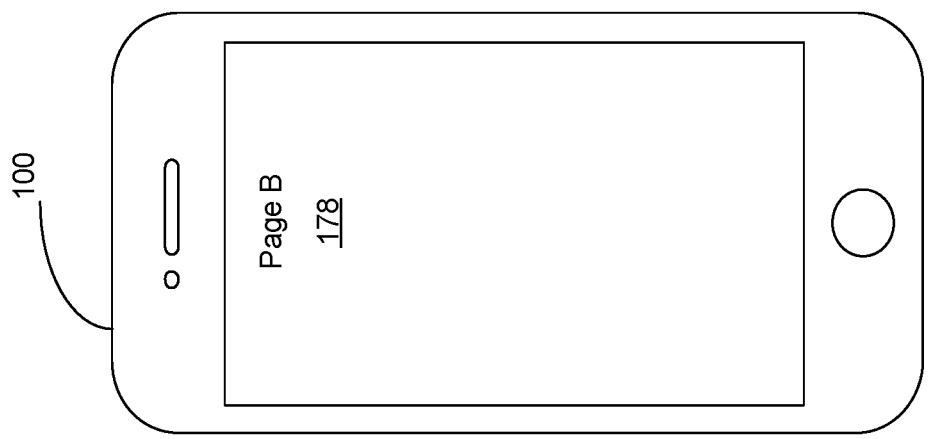
FIGS. 4A-4C illustrate another example in which gaze input in combination with touch input is used to provide progressive preview of information from a page, in accordance with examples of the present disclosure.
Figure 4B:
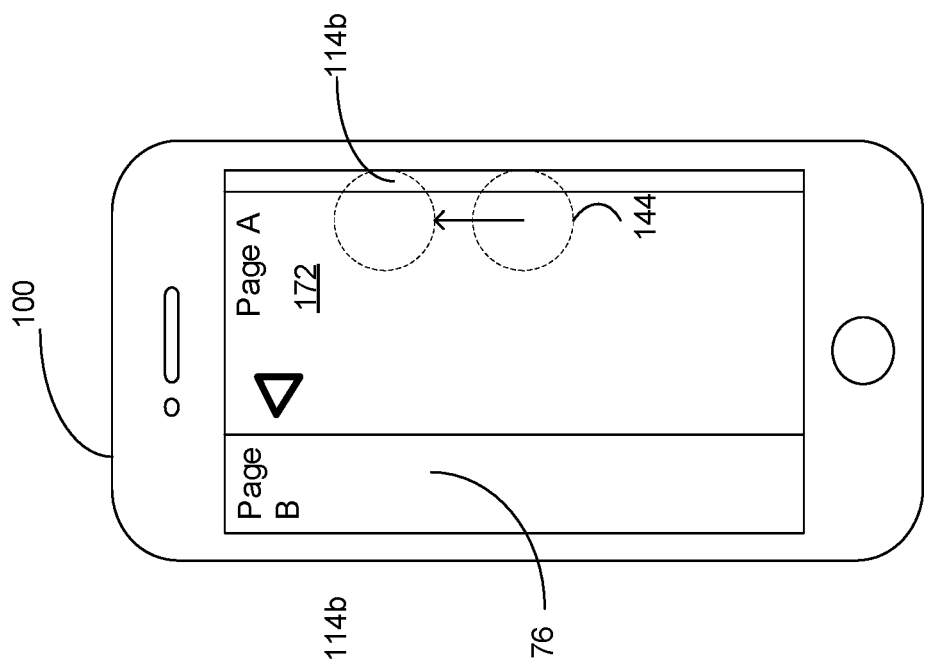
Figure 4A:
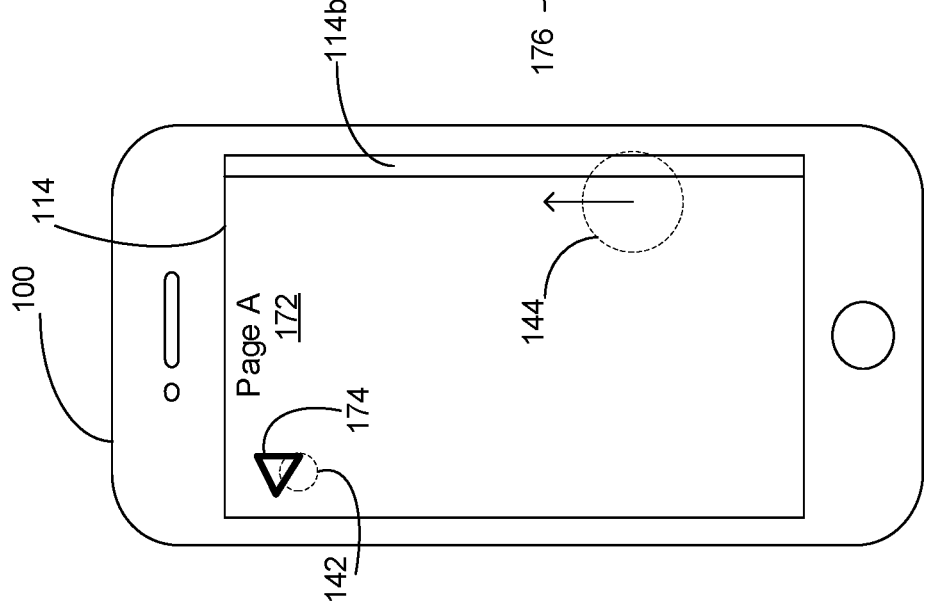

FIGS. 4A-4C illustrate another example embodiment in which gaze input in combination with touch input is used to provide progressive preview of information related to an interactive element, in this case progressive preview of information from a page related to the interactive element. Although FIGS. 4A-4C are illustrated in the context of a smartphone as the electronic device 100, this is not intended to be limiting.

In FIG. 4A, a first page 172 is being shown in a browser application. The gaze input 142 is detected at an estimated location at or near a particular interactive element 174 (e.g., a "back" button), which may be identified as the target interactive element 174. While the gaze input 142 is on the target interactive element 174, a touch input 144 is detected (e.g., along the edge portion 114b or elsewhere on the display 114). The touch input 144 is a moving (or dynamic) input, such as a swipe gesture or drag gesture.

As shown in FIG. 4B, in response to the moving touch input 144, a preview 176 of a second page (e.g., the previously viewed page in the browser history) is generated. The preview 176 may be used to display information from the second page (e.g., a heading of the webpage). In some examples, the preview 176 may be displayed as a navigation animation (e.g., similar to sliding over a window or turning a page). The preview 176 may increase in size, corresponding to increasing distance traversed by the touch input 144, in a manner similar to that described previously with respect to FIGS. 2A-2C.

When the touch input 144 has traversed a threshold distance, the page 178 related to the target interactive element 174 may be fully opened in the browser, as shown in FIG. 4C.

As illustrated in the above examples and discussed elsewhere in this disclosure, the combination of gaze and touch input to preview and subsequently open an application or page may provide an intuitive and/or efficient user interface. The use of gaze input as a means of identifying the target interactive element, following by a moving touch input to generate a preview may be more efficient and/or effective than relying on touch input alone. For example, relying on touch input to select the target interactive element requires target seeking by the user's finger. This may require more time, more focus and/or more dexterity compared to the example interactions using a combination of gaze and touch inputs as described above. Examples of the present disclosure may thus provide improved user interactions, such as for users having limited dexterity, distracted users, or users in a rush. As well, if the display area is large (e.g., the display of an interactive kiosk) using gaze input as a means of identifying the target interactive element may avoid the need to physically move the user's hand or finger to the target interactive element, thus improving accessibility of the overall user interface and improving the speed of user interactions.

Figure 5:
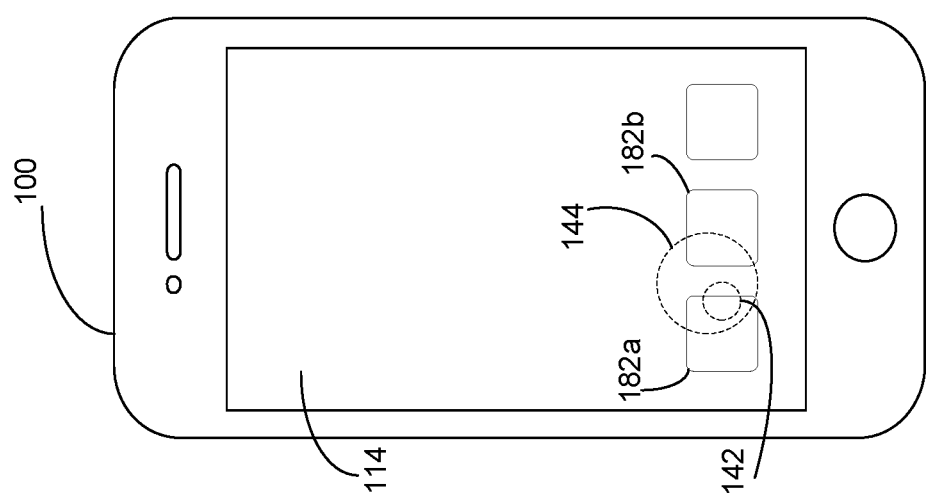
FIG. 5 illustrates an example in which gaze input is used to disambiguate touch input, in accordance with examples of the present disclosure.

FIG. 5 illustrates an example embodiment in which gaze input may be used to disambiguate touch input. Although FIG. 5 is illustrated in the context of a smartphone as the electronic device 100, this is not intended to be limiting.

In FIG. 5, a plurality of interactive elements (e.g., selectable icons) are shown on the touch-sensitive display 114, for example while a home screen or application selection page is displayed. A touch input 144 is detected that overlaps with a first interactive element 182*a* as well as a second interactive element 182*b*. The location of the touch input 144 may be determined to be the centroid of the detected touch (e.g., weighted based on the amount of pressure sensed over the touch area). The location of the touch input 144 may fall in the space between the two interactive elements 182*a*, 182*b* such that the UI controller 134 is not able to determine which of the two interactive elements 182*a*, 182*b* is the intended target of the touch input 144. In this example, gaze input 142 is also detected. The estimated location of the gaze input 142 may be used to disambiguate the touch input 144.

The gaze input 142 may be used to determine the intended target of the touch input 144 in various ways. For example, if the location of the gaze input 142 falls within the region encompassed by the touch input 144, the location of the gaze input 142 may be used as the location of the touch input 144, in order to help identify the intended target of the touch input 144. In the example of FIG. 5, by taking the location of the gaze input 142 as the location of the touch input 144, the UI controller 134 may determine that the first interactive element 182*a* is the intended target and thus the first interactive element 182*a* is selected by the touch input 144.

In another example, the intended target may be determined based on computing a midpoint or average between the location of the gaze input 142 and the centroid of the touch input 144. In another example, the location of the gaze input 142 may be used as a weighting factor when computing the centroid of the touch input 144. Other techniques may be used to combine the location of the gaze input 142 with the touch input 144.

It should be understood that the gaze input 142 may be used to help disambiguate touch input 144 in various scenarios, and is not limited to selection of icons.

Thus, FIG. 5 illustrates an embodiment in which gaze input may be used to identify the intended target of a touch input, in scenarios where the intended target of the touch input cannot be easily determined. Such an embodiment may be useful for users with larger fingers and/or for improving user interaction with small touch-sensitive displays, for example. By using gaze input to assist in disambiguation of touch input, unintentional selection of interactive elements may be avoided, thus reducing the unnecessary usage of computing resources to process the unintended input. Further, user interactions may be sped up and/or simplified, by avoiding the need for a user to focus on and select the intended interactive element.

Figure 6C:
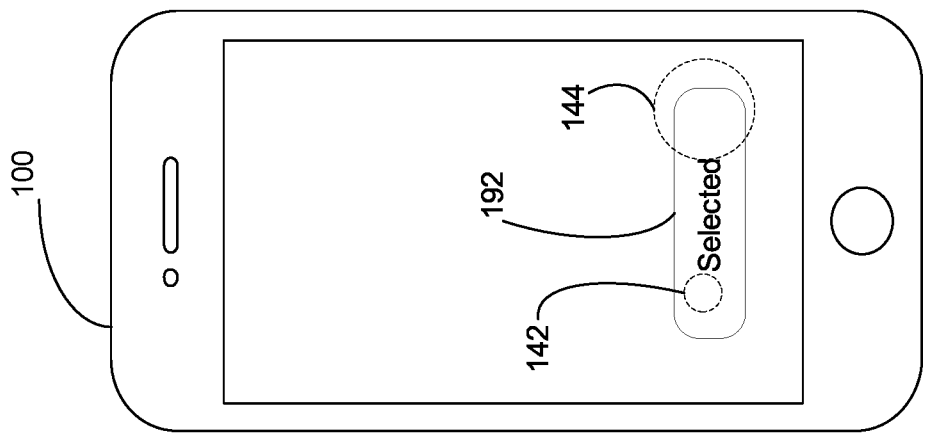
FIGS. 6A-6C illustrate another example in which gaze input is used to disambiguate touch input, in accordance with examples of the present disclosure.
Figure 6B:
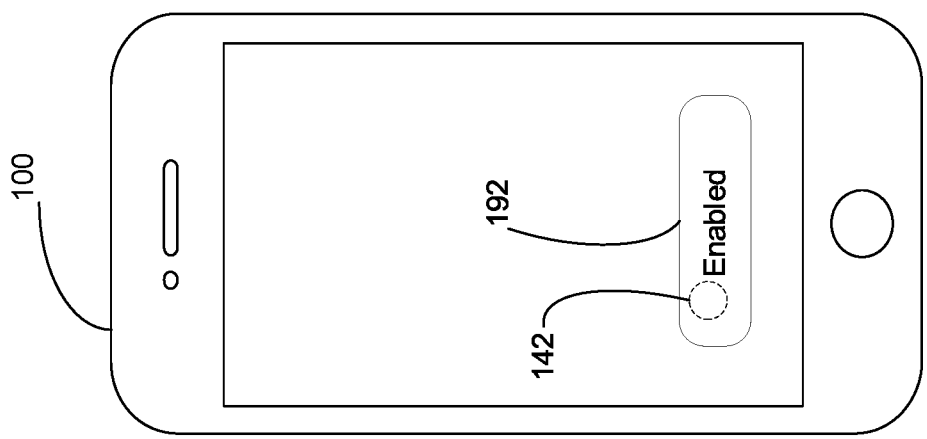
Figure 6A:
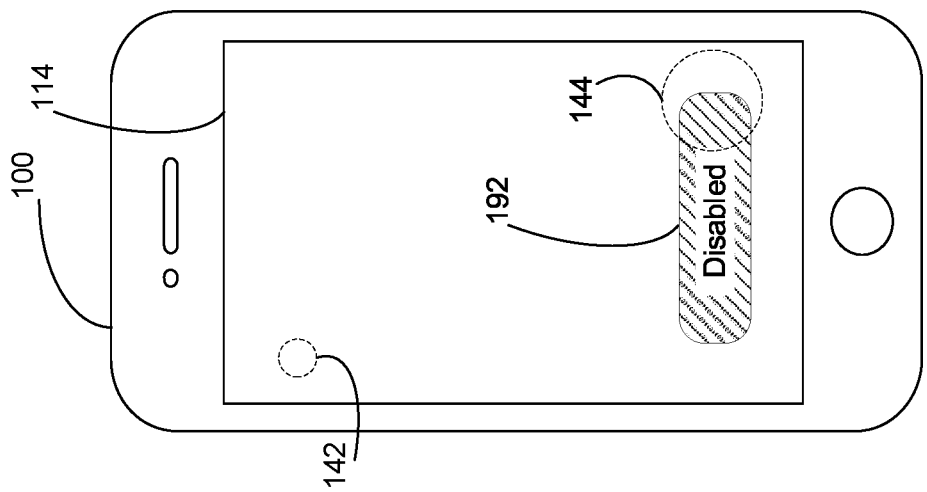

FIGS. 6A-6C illustrate another example embodiment in which gaze input may be used to disambiguate between valid and invalid touch input. Although FIGS. 6A-6C are illustrated in the context of a smartphone as the electronic device 100, this is not intended to be limiting.

In FIG. 6A, an interactive element 192 is displayed in the display 114 of the electronic device 100. Notably, when the gaze input 142 is at an estimated location other than the interactive element 192, the interactive element 192 is controlled to be in a disabled state. While in the disabled state, the interactive element 192 is not selectable by touch inputs. Accordingly, when touch input 144 is detected at the interactive element 192, the interactive element 192 is not selected, and any function or application that would otherwise be activated by selection of the interactive element 192 is not activated.

In FIG. 6B, the gaze input 142 is detected at an estimated location at or near the interactive element 192. As a result of detecting the gaze input 142 at or near the interactive element 192, the UI controller 134 changes the state of the interactive element 192 to be in an enabled state. While in the enabled state, the interactive element 192 is selectable by touch inputs.

In FIG. 6C, touch input 144 is detected at the interactive element 192 that is now in the enabled state. The interactive element 192 thus is selected by the touch input 144. Any function or application that would be activated by selection of the interactive element 192 may thus be activated. In some examples, the interactive element 192 may remain in the enabled state only as long as the gaze input 142 is detected at or near the interactive element 192. In some examples, the interactive element 192 may remain in the enabled state for a short defined time period (e.g., 5 seconds) after the gaze input 142 is no longer detected at or near the interactive element 192.

The example illustrated in FIGS. 6A-6C may be useful to avoid unintentional selection of an interactive element resulting from unintentional or invalid touch inputs (e.g., resulting from the user touching the touch-sensitive display while reaching for the electronic device, or resulting from other conductive material such as water coming into contact with the touch-sensitive display). This may be particularly useful where the interactive element is related to important functions or applications, such as security-, privacy- or financial-related functions or applications of the electronic device.

In some examples, the use of gaze input to enable an interactive element may be useful as a mechanism for detecting whether the selection of the interactive element is from a valid user. This may be a useful mechanism for rejecting non-human inputs (e.g., from a bot). Additionally, the user may be asked to gaze at different targets on the display in sequence, as a mechanism for determining the user is a human, before the interactive element is enabled.

In some examples, the gaze tracking performed by the electronic device may be calibrated to individual humans. This means that gaze input (possible in combination with touch input) may be used to derive biometric data (e.g., derived from dwell time of gaze, pupil size, drifting of gaze, etc.) to distinguish between different human users. In this way, gaze input may be used to enable an interactive element only to an authorized or valid user (e.g., only an authorized user may view the user's bank account on a banking application, or access the user's personal data, etc.), without requiring the use of more complex biometrics such as facial recognition or fingerprint recognition.

Figure 7:
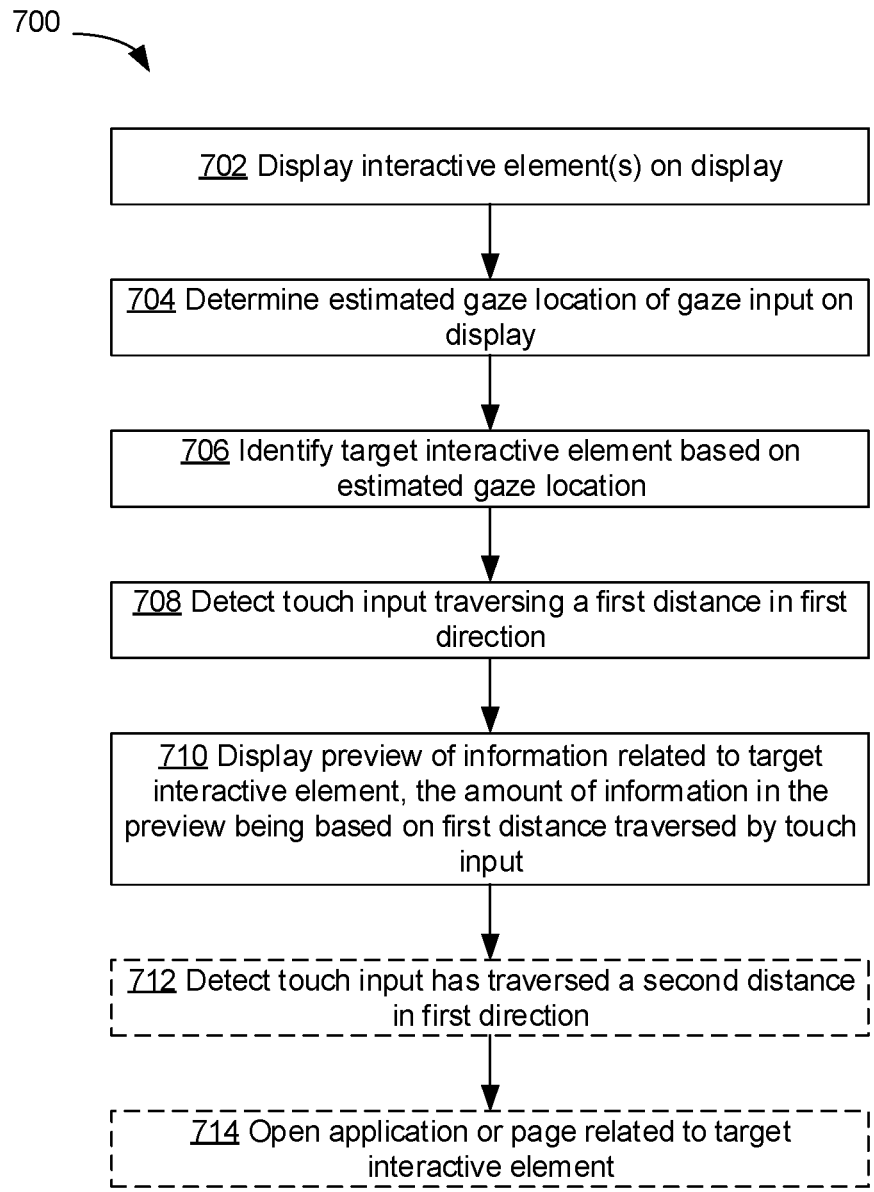
FIG. 7 is a flowchart illustrating an example method for providing progressive preview of information based on a combination of gaze and touch inputs, in accordance with examples of the present disclosure.

FIG. 7 is a flowchart illustrating an example method 700 for providing progressive preview of information related to an interactive element, based on a combination of gaze and touch inputs. The method 700 may be implemented by an electronic device (e.g., the electronic device 100 of FIGS. 1A and 1B). For example, the processing unit 102 may execute instructions in the memory 108 (e.g., instructions for the gaze tracker 132 and/or UI controller 134) to cause the electronic device 100 to carry out the example method 700.

At 702, one or more interactive elements are displayed on a display of the electronic device. For example, the interactive element(s) may include selectable icons, selectable soft buttons and/or selectable links, among others. The display may be a touch-sensitive display.

At 704, while the interactive element(s) are displayed, an estimated gaze location is determined on the display. For example, the gaze tracker 132 may track the estimated gaze location (e.g., in x-y coordinates, which may be represented in pixels). The estimated gaze location may be provided to the UI controller 134.

At 706, a target interactive element is identified (from among the one or more displayed interactive elements) based on the estimated gaze location. For example, the UI controller 134 may identify the target interactive element to be the displayed interactive element that is at or near the estimated gaze location. Optionally, the UI controller 134 may cause the target interactive element to be visually indicated (e.g., highlighted in the display, displayed in a larger size or using more prominent font, etc.).

At 708, a touch input is detected that traverses a first distance in a first direction. The touch input may be detected while the gaze input is determined to be at the estimated gaze location that is at or near the target interactive element, or within a short time period (e.g., within 1 s) of the gaze input being at the target interactive element. The touch input may be detected using any type of touch sensor, such as capacitive sensors, resistive sensors, pressure sensors, etc. The touch input may be detected at an edge portion of a touch-sensitive display, elsewhere on the touch-sensitive display, on a touch-sensitive back of the electronic device, etc. The first direction may be in a direction that moves away from the location of the target interactive element (e.g., if the target interactive element is displayed towards the bottom of the touch-sensitive display, the first direction may be towards the top of the touch-sensitive display, and vice versa), however this is not intended to be limiting. The distance and/or direction traversed by the touch input may be provided to the UI controller 134, which may process the touch input based on selection of the target interactive element by the gaze input.

At 710, a preview is displayed that displays information related to the target interactive element (e.g., information from an application or webpage related to the target interactive element). The amount of information displayed in the preview is based on the first distance traversed in the first direction by the touch input. The amount of information displayed in the preview may be proportionate to the first distance traversed by the touch input, or may be based on the first distance exceeding a predefined distance threshold. For example, the preview may display a first amount of information when the first distance exceeds a first distance threshold; and the preview may display a larger second amount of information when the first distance exceeds a larger second distance threshold. The type and/or amount of information that is displayed in the preview may be dependent on the application or webpage related to the interactive element.

Optionally, as previously discussed, the size of the preview may correspond to the first distance (e.g., the preview may gradually increase in size as the touch input traverses a greater distance, or the preview may increase in size in a stepwise manner as the distance traversed by the touch input reaches certain distance thresholds). The amount of information displayed in the preview may be controlled by the size of the preview (e.g., the larger the size of the preview, the greater the amount of information that can be displayed in the preview).

Optionally, the displayed preview, including the amount of information displayed in the preview, may be continuously controlled based on the touch input with or without the estimated location of the gaze input remaining at the target interactive element. For example, if the touch input continues to traverse to a farther distance, greater than the first distance, in the first direction, the amount of information displayed in the preview may be increased. The amount of information displayed may be increased in a stepwise manner (e.g., if the farther distance exceeds a second distance threshold) or proportionate to the farther distance. If the touch input moves a distance in a second direction that is opposite or approximately opposite to the first direction, the amount of information displayed in the preview may be decreased.

Optionally, if a notification indicator is displayed on or near the target interactive element and the estimated location of the gaze input is determined to be at the notification indicator specifically, the information displayed in the preview may be related to the notification indicator. For example, a notification indicator for an email application may indicate an unread email. When the estimated location of the gaze input is determined to be at this notification indicator, the information displayed in the preview may be a preview of the unread email.

Optionally, at 712, while the touch input is maintained (e.g., the drag gesture or swipe gesture has not been released), it may be detected that the touch input has traversed a second distance, greater than the first distance, in the first direction. The second distance may be distance that exceeds a third distance threshold that is greater than the previously mentioned first and second distance thresholds.

Optionally, at 714, in response to the touch input traversing the second distance, the application or page related to the target interactive element may be opened. The touch input may then be released and the opened application or page may remain opened.

The method 700 may be used to implement various examples described herein, such as the examples of FIGS. 2A-2C, FIGS. 3A-3C and FIGS. 4A-4C.

Figure 8:
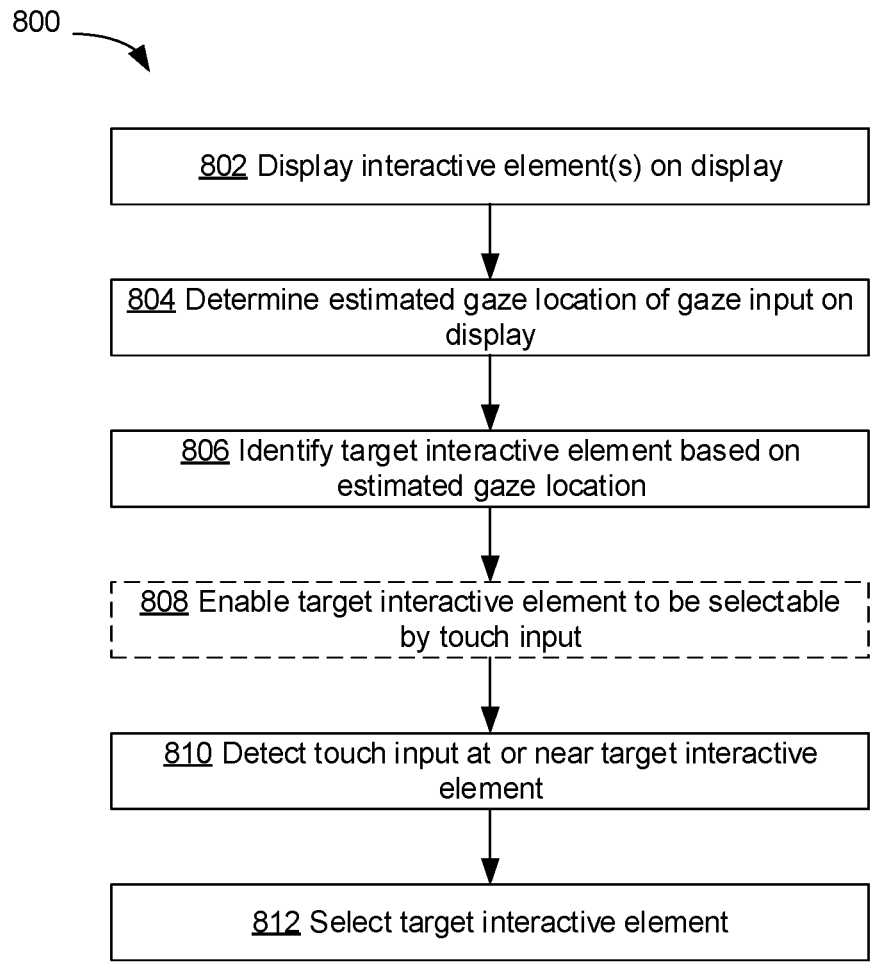
FIG. 8 is a flowchart illustrating an example method for using gaze input to disambiguate touch input, in accordance with examples of the present disclosure.

FIG. 8 is a flowchart illustrating an example method 800 for using a combination of gaze and touch inputs to disambiguate touch input. For example, the method 800 may be used to disambiguate between two (or more) possible intended interactive elements. The method 800 may additionally or alternatively be used to disambiguate between a valid touch input and an invalid touch input. The method 800 may be implemented by an electronic device (e.g., the electronic device 100 of FIGS. 1A and 1B). For example, the processing unit 102 may execute instructions in the memory 108 (e.g., instructions for the gaze tracker 132 and/or UI controller 134) to cause the electronic device 100 to carry out the example method 800.

At 802, one or more interactive elements are displayed on a display of the electronic device. For example, the interactive element(s) may include selectable icons, selectable soft buttons and/or selectable links, among others. The display may be a touch-sensitive display.

At 804, while the interactive element(s) are displayed, an estimated gaze location is determined on the display. For example, the gaze tracker 132 may track the estimated gaze location (e.g., in x-y coordinates, which may be represented in pixels). The estimated gaze location may be provided to the UI controller 134.

At 806, a target interactive element is identified (from among the one or more displayed interactive elements) based on the estimated gaze location. For example, the UI controller 134 may identify the target interactive element to be the displayed interactive element that is at or near the estimated gaze location. Optionally, the UI controller 134 may cause the target interactive element to be visually indicated (e.g., highlighted in the display, displayed in a larger size or using more prominent font, etc.).

Optionally, at 808, the target interactive element may be enabled (e.g., transitioned from the disabled state in which the target interactive element is not selectable by touch input to the enabled state in which the target interactive element is selectable by touch input). Optionally, the UI controller 134 may cause the interactive element in the enabled state to be visually distinguishable from the disabled state. When touch input is detected at or near a disabled interactive element, the interactive element may not be selected by the touch input (e.g., the function that would otherwise be executed by selection of the interactive element may not be executed and/or the interactive element is not displayed as being selected). Additionally or alternatively, when touch input is detected at or near a disabled interactive element, a notification may be displayed indicating that the interactive element needs to be enabled first.

In some examples, the target interactive element may be enabled based on biometric data derived from the gaze input (optionally in combination with biometric data derived from the touch input such as touch duration, size of touch region, etc.). This may enable the gaze input to be used as a mechanism of enabling the target interactive element only for an authorized user (e.g., where selection of the target interactive element would reveal sensitive user information).

At 810, a touch input is detected at or near the target interactive element. The touch input may be detected while the gaze input is determined to be at the estimated gaze location that is at or near the target interactive element, or within a short time period (e.g., within 1 s) of the gaze input being at the target interactive element. The touch input may be also detected at or near another different interactive element (e.g., the touch input may be a touch region that encompasses part of the target interactive element as well as part of another different interactive element). The location of the touch input may be provided to the UI controller 134, which may process the touch input based on selection of the target interactive element by the gaze input.

At 812, the target interactive element is selected. If selection of the target interactive element causes a function to be executed (e.g., selection of the target interactive element causes an application to be launched, causes navigation to a webpage, causes submission of information, etc.), the function may be executed.

The method 800 may be used to implement various examples described herein, such as the examples of FIG. 5 and FIGS. 6A-6C.

It should be understood that examples described above may be implemented in combination. For example, method 800 may be used to enable a target interactive element and then method 700 may be used to display a preview of information related to that target interactive element. Other such combinations may be possible.

In various examples, the present disclosure describes methods and devices that enable a combination of gaze and touch input to be used to interact with a user interface. A combination of gaze input and moving touch input (e.g., swipe input or drag input) may be used to target an interactive element and display a preview of information related to the target interactive element. The amount of information displayed in the preview may be based on the distance traversed by the touch input. This conveniently enables a user to preview information from an application or webpage related to an interactive element, using fewer touch inputs. Additionally, the user may be enabled to preview information without having to fully open the related application or webpage, which may be more efficient and require fewer processing power.

In some examples, moving the touch input a distance that exceeds a predefined threshold may cause the application or webpage related to the target interactive element to be opened. Notably, this may be performed by a combination of gaze input to select the target interactive element and touch input that is detected anywhere. This provides a convenient way for a user to open an application or webpage without requiring touch input to be detected at the related target interactive element. This may be useful in cases where it would be difficult or time consuming for the user to move their finger to touch the location of the target interactive element (e.g., in the case of a large touch-sensitive display such as an interactive kiosk).

In some examples, if the gaze input is determined to be at the location of a notification indicator associated with the target interactive element, the information provided in the preview may be related to the notification indicator. For example, if the notification indicator indicates unread message(s), the information in the preview may be a preview of the unread message(s). This provides an efficient way for a user to view and clear the notification indicator.

The present disclosure also describes example methods and devices in which gaze input may be used to disambiguate touch input. For example, gaze input may be used to determine the intended target of a touch input when the touch input falls within the probably region for selection of two (or more) interactive elements. This provides a convenient and intuitive way for a user to interact with interactive elements in a small display (where the interactive elements may be smaller and/or may be more crowded together). This also avoids wasted processing power when the user's touch input is misinterpreted as selection of an unintended interactive element.

The present disclosure also describes example methods and devices in which gaze input may be used to disambiguate between valid and invalid touch inputs. For example gaze input may be used to enable an interactive element so that the interactive element can be selectable by touch input. This may be useful to prevent unintentional selection of an interactive element (e.g., due to stray touches by the user), thus avoiding wasted processing power to process the unintended selection. Further, the use of gaze input may be a mechanism to distinguish between valid human input and invalid non-human input (e.g., bots).

Examples of the present disclosure may be applicable to any electronic device that is capable of receiving touch inputs (e.g., has touch-sensitive display or other sensors capable of detecting touch) and/or is in communication with a touch-sensitive input device. The electronic device may also be capable of gaze tracking and/or is in communication with a gaze tracking system. The electronic device may include smartphones, touch-enabled monitors, laptop devices, desktop devices (which may be coupled to a touch-sensitive input device), tablet devices, e-reader or e-ink display devices, smart watches, and gaming devices, among others.

It should be understood that examples of the present disclosure may be embodied as a method, an apparatus, a non-transitory computer readable medium, a processing module, a chipset, a system chip or a computer program, among others. An apparatus may include a transmitting module configured to carry out transmitting steps described above and a receiving module configured to carry out receiving steps described above. An apparatus may include a processing module, processor or processing unit configured to control or cause the apparatus to carry out examples disclosed herein.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein. The machine-executable instructions may be in the form of code sequences, configuration information, or other data, which, when executed, cause a machine (e.g., a processor or other processing device) to perform steps in a method according to examples of the present disclosure.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method at an electronic device, the method comprising:
during display of one or more interactive elements on a display of the electronic device, determining an estimated gaze location of a gaze input on the display;
identifying a target interactive element of the one or more interactive elements, based on the estimated gaze location;
detecting touch input that traverses a first distance in a first direction; and
displaying a preview of information related to the target interactive element, a quantity of the information displayed in the preview being changed based on the first distance traversed by the touch input, wherein the preview increases in size based on increasing a distance traversed by the touch input in the first direction and the quantity of the information displayed in the preview is also increased, and wherein the preview decreases in size based on the touch input continuing to move in a second direction opposite to the first direction and the quantity of the information displayed in the preview is also decreased.

2. The method of claim 1, further comprising:
detecting that the touch input further continues to traverse a farther distance, greater than the first distance, in the first direction; and
increasing the quantity of information displayed in the preview based on the farther distance.

3. The method of claim 1, wherein a first quantity of information is displayed in the preview based on the first distance traversed by the touch input exceeding a first distance threshold.

4. The method of claim 1, further comprising:
detecting that the touch input further continues to traverse a second distance, which exceeds a second distance threshold, in the first direction; and
causing an application or page related to the target interactive element to be opened.

5. The method of claim 1, wherein a notification indicator of the target interactive element is identified based on the estimated gaze location, and wherein the information displayed in the preview is further related to the notification indicator.

6. The method of claim 1, wherein the target interactive element is a selectable icon related to an application, and the information displayed in the preview is a preview of information from the application.

7. The method of claim 1, wherein the target interactive element is a selectable link related to a page, and the information displayed in the preview is a preview of information from the page.

8. The method of claim 1, further comprising:
prior to detecting the touch input, enabling the target interactive element based on the estimated gaze location;
wherein enabling the target interactive element enables the preview to be displayed based on the touch input.

9. An electronic device comprising:
a memory storing instructions; and
a processor configured to execute the instructions to cause the electronic device to:
during display of one or more interactive elements on a display of the electronic device, determine an estimated gaze location of a gaze input on the display;
identify a target interactive element of the one or more interactive elements, based on the estimated gaze location;
detect touch input that traverses a first distance in a first direction; and
display a preview of information related to the target interactive element, a quantity of the information displayed in the preview being changed based on the first distance traversed by the touch input, wherein the preview increases in size based on increasing a distance traversed by the touch input in the first direction and the quantity of the information displayed in the preview is also increased, and wherein the preview decreases in size based on the touch input continuing to move in a second direction opposite to the first direction and the quantity of the information displayed in the preview is also decreased.

10. The electronic device of claim 9, wherein the instructions further cause the electronic device to:
  detect that the touch input further continues to traverse a farther distance, greater than the first distance, in the first direction; and
  increase the quantity of information displayed in the preview based on the farther distance.

11. The electronic device of claim 9, wherein a first quantity of information is displayed in the preview based on the first distance traversed by the touch input exceeding a first distance threshold.

12. The electronic device of claim 9, wherein the instructions further cause the electronic device to:
  detect that the touch input further continues to traverse a second distance, which exceeds a second distance threshold, in the first direction; and
  cause an application or page related to the target interactive element to be opened.

13. The electronic device of claim 9, wherein the instructions further cause the electronic device to:
  prior to detecting the touch input, enable the target interactive element based on the estimated gaze location;
  wherein enabling the target interactive element enables the preview to be displayed based on the touch input.

14. A method at an electronic device, the method comprising:
  during display of one or more interactive elements on a display of the electronic device, determining an estimated gaze location of a gaze input on the display;
  identifying a target interactive element of the one or more interactive elements, based on the estimated gaze location, wherein the target interactive element is disabled and unselectable prior to determining the estimated gaze location, wherein the target interactive element is enabled, based on the estimated gaze location, to be selectable by touch input;
  detecting touch input at or near the target interactive element; and
  selecting the target interactive element based on the detected touch input.

15. The method of claim 14, wherein the target interactive element is enabled based on biometric data derived from the gaze input.

16. The method of claim 14, wherein the touch input is also detected at or near another different interactive element, and wherein the target interactive element is selected based on the gaze input and touch input.

17. The method of claim 1, wherein the touch input is detected at or near an edge portion of the display, and wherein the touch input traverses the first distance in the first direction that is along the edge portion of the display.

18. The electronic device of claim 9, wherein a notification indicator of the target interactive element is identified based on the estimated gaze location, and wherein the information displayed in the preview is further related to the notification indicator.

19. The electronic device of claim 9, wherein the touch input is detected at or near an edge portion of the display, and wherein the touch input traverses the first distance in the first direction that is along the edge portion of the display.

20. A non-transitory computer readable medium storing instructions, which when executed by a processor, cause an electronic device to:
  during display of one or more interactive elements on a display of the electronic device, determine an estimated gaze location of a gaze input on the display;
  identify a target interactive element of the one or more interactive elements, based on the estimated gaze location;
  in response to identifying the target interactive element, enable a preview of information related to the target interactive element to be displayed based on a touch input;
  detect the touch input, the touch input traversing a first distance in a first direction; and
  in response to detecting the touch input, display the preview of information, the preview increasing in size based on increasing a distance traversed by the touch input in the first direction and a quantity of the information displayed in the preview is also increased, and the preview decreasing in size based on the touch input continuing to move in a second direction opposite to the first direction and the quantity of the information displayed in the preview is also decreased.

21. The non-transitory computer readable medium of claim 20, wherein the target interactive element is a selectable icon related to an email application, and the information displayed in the preview includes information related to an email.

* * * * *